J. E. FOULKS, Jr.
ELECTRIC HORN SWITCH.
APPLICATION FILED DEC. 12, 1912.

1,098,242.

Patented May 26, 1914.

WITNESSES
Edward Thorpe.
A. L. Kitchin.

INVENTOR
James E. Foulks Jr.
BY
ATTORNEYS

UNITED STATES PATENT OFFICE.

JAMES E. FOULKS, JR., OF NEW YORK, N. Y.

ELECTRIC-HORN SWITCH.

1,098,242.  Specification of Letters Patent.  Patented May 26, 1914.

Application filed December 12, 1912. Serial No. 736,310.

*To all whom it may concern:*

Be it known that I, JAMES E. FOULKS, Jr., a citizen of the United States, and a resident of the city of New York, borough of Brooklyn, in the county of Kings and State of New York, have invented a new and Improved Electric-Horn Switch, of which the following is a full, clear, and exact description.

This invention relates to improvements in means for quickly turning on the electric current to an automobile horn or siren at any time without removing the hand of the operator from the steering wheel or steering mechanism.

An object in view is to provide an improved arrangement on the steering mechanism of an automobile or other device, which will allow the fingers of the operator to actuate a switch for closing the circuit of the horn without removing either of his hands from the controlling mechanism.

A further object of the invention is to provide a contact ring on one side of the steering wheel of an automobile, or similar device, which ring may be moved in one direction by the hand of the operator without moving the same from the wheel, the ring being normally pressed in an opposite direction by one or more springs so as to hold the contact or switch mechanism of the horn open.

A still further object of the invention more specifically, is to provide a plurality of clamping members designed to clamp the spokes of an automobile steering wheel, so as to hold in place a contact mechanism carrying an operating or contact ring, which may be easily grasped for moving the contacts to a closed position whenever it is desired to cause the horn to be sounded.

In carrying out the objects of the invention, the device may be used on any kind of steering mechanism, either on an automobile, or other device, without departing from the spirit of the invention. When applying it to the usual steering wheel of an automobile, a clip or clamping member is provided for each spoke of the wheel, to which is connected a contact member, and also a contact ring, the contact ring being held resiliently in place by a plurality of spaced springs. Connected with the ring, and with the various clamps, are contact terminals normally held apart, but adapted to be easily closed whenever desired for causing the circuit of an automobile horn to be closed.

A practical embodiment of the invention is represented in the accompanying drawings forming a part of this specification, in which similar characters of reference indicate corresponding parts in all the views.

Figure 1:
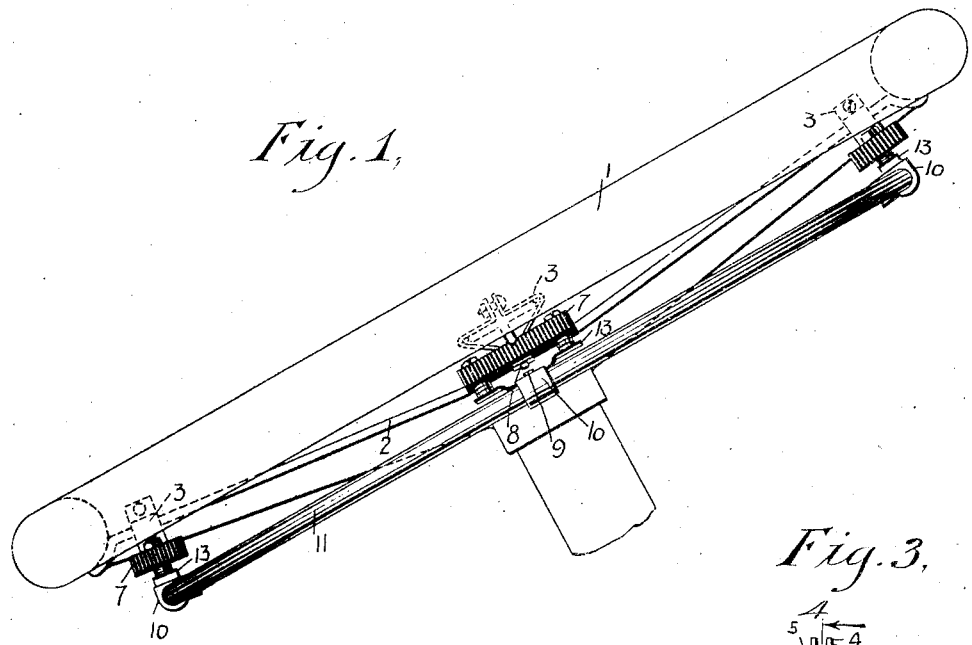
Figure 2:
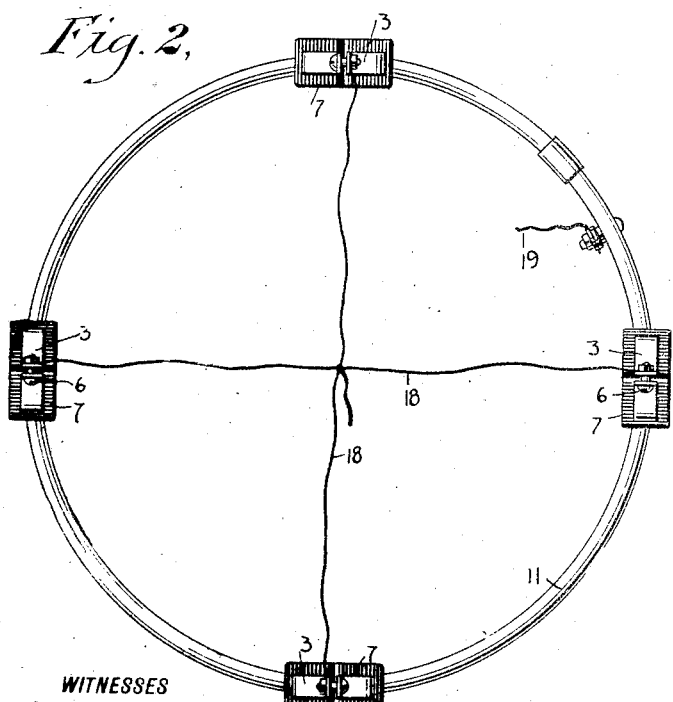
Figure 3:
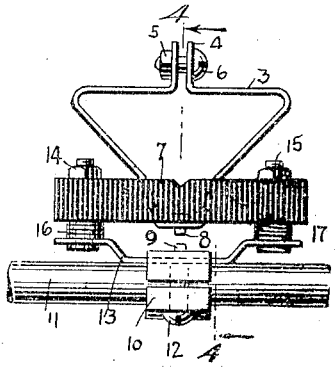
Figure 4:
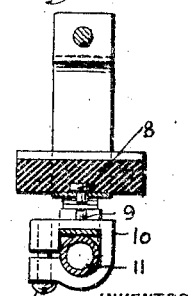

Figure 1 is a side view of the steering wheel of an automobile, or similar device, with an embodiment of the invention shown connected therewith; Fig. 2 is a top plan view of an embodiment of the invention removed; Fig. 3 is an enlarged detail fragmentary view showing one of the clamping members, contacts, and associated parts; and Fig. 4 is a section through Fig. 3 on the line 4—4.

In the use of the siren or electric horn on automobiles, or other vehicles, usually the switch or push button is positioned at some convenient point, but an appreciable distance away from the periphery of the steering wheel. In the present invention means have been provided which are adapted to be operated by the driver at any time without removing his hands from the steering wheel, and without changing the position thereof. The most need of the electric horn on an automobile is at the very moment when the operator's hands are busy in steering the machine, so that at that time the steering mechanism must be liberated, or partially liberated, in order to sound the horn. In the present construction and arrangement it is aimed to overcome these difficulties and to present a structure which will allow the operator to sound the horn without shifting the position of his hands.

Referring to the accompanying drawings by numerals, 1 indicates the usual steering wheel of an automobile, having the usual spokes 2. Any desired number of spokes 2 are provided, but on each spoke is arranged a clamp 3. These clamps, as more clearly shown in Fig. 3, are formed of a shape to properly fit the spokes of the wheel 1, and consequently may be of any desired shape. Preferably, in forming the clamp 3, upturned members 4 and 5 are provided through which a clamping bolt 6 is passed for positively causing the clamp to firmly engage the spoke. At the opposite side of clamp 3 to bolt 6, is secured a block of insulation 7, the same being connected with the clamp in any desired way. Connected with clamp 3 is a contact member 8, as clearly shown in Fig. 4, designed to co-act with a contact or terminal 9 mounted in a clamp 10, which is grounded on a metallic bar 11. The bar 11 is formed of a shape to conform to the shape of the wheel 1, and is made slightly smaller than wheel 1 so that the wheel may be properly operated without coming in contact with bar 11. However, bar 11 is made sufficiently large so that the operator may easily press the same with his fingers at any time, and at any point around the periphery of the wheel 1. The clamps 10 connected with bar 11, are held in place by suitable binding screws 12, which in turn clamp to bar 11 the respective springs 13. Each of the springs 13 is connected with bolts 14 and 15 which extend upwardly through the insulation 7. The bolts 14 and 15 are preferably made sufficiently long to accommodate a number of washers 16 and 17, so that the various inequalities in the arrangement of the spokes and other construction of the steering mechanism may be taken care of, and the bar 11 and the various contacts or terminals 8 and 9 may be adjusted in position for acting correctly. The electric wires from the horn may be connected to the terminals 8 and 9 in any desired manner, preferably by having the clamps 3 connected together by suitable wiring 18, as shown in Fig. 2, and by having the opposite wire 19 connected to a suitable binding post on the bar 11. From this it will be observed that whenever bar 11 is pressed toward wheel 1, one or more of the contacts or terminals 8 and 9 will be brought together so that the circuit of the horn is closed and the horn is supposed to sound. The bar 11 is preferably made from metal, but if desired, the same could be made from other material, and a suitable connecting wire could be provided for connecting the various terminals 9, so that the circuit will be closed whenever bar 11 is moved.

Having thus described my invention I claim as new and desire to secure by Letters Patent:—

1. In a device of the character described, the combination with the steering wheel of an automobile, of clamps connected therewith, a contact connected with each of said clamps, contacts arranged opposite said first mentioned contacts, and a bar conforming to the shape of said wheel for supporting said last mentioned contacts.

2. In a device of the character described, the combination with the steering wheel of an automobile, an electric horn, and a circuit therefor, of a movable bar conforming to the shape of said steering wheel and supported therefrom, a spring for holding said movable bar spaced from said steering wheel, and contact members, one of the contact members being supported by said bar and the other contact member being supported by said steering wheel, said contacts being arranged in line so as to engage when the movable member is moved a predetermined distance toward the steering wheel whereby when the bar is moved against the action of said spring, said circuit will be closed.

3. In a device of the character described, the combination with an automobile steering wheel, of an electric horn, means for closing the circuit of said horn, said means comprising a movable ring arranged adjacent said steering wheel, a plurality of springs for holding said ring in a predetermined position, a plurality of contacts carried by said ring, a plurality of clamping members connected with said wheel, and means for connecting said springs and said clamping members together, said means including an insulating block, whereby said clamping members and said ring are insulated from each other.

4. In a device of the character described, the combination with the steering wheel of an automobile, of an electric horn, a circuit for said horn, said circuit including a plurality of insulated contacts arranged on said steering wheel, and a plurality of coacting contacts, a supporting member supporting said last mentioned contacts, said supporting member being formed in substantially the same shape as said supporting wheel so as to be grasped and moved toward the steering wheel by the hand at any point around the steering wheel, whereby some of said contacts will be closed, and resilient means for normally holding said member spaced at sufficient distance from said steering wheel to move said contacts out of engagement.

5. In a device of the character described, a contact ring, a supporting bracket, an insulating bar connected with said bracket, a terminal contact supported by said insulating bar, a spring connected with said insulating bar and with said contact ring for spacing the contact ring and the insulating bar a predetermined distance apart, a terminal contact, and a clamp for clamping said terminal contact and said spring to said contact ring.

6. In a device of the character described, the combination with an automobile steering wheel, of a plurality of contacts connected therewith, a hand rail disposed in a plane close to the plane of the steering wheel and provided with contact members, extending toward said first mentioned contacts, and a spring for normally holding said hand rail in such a position as to hold said contacts separated.

7. In a device of the character described, the combination with the steering wheel of an automobile, of a finger rail made of such a size as to be readily engaged by the fingers of the operator when the operator's hand is contacting with said steering wheel, a plurality of spaced contact members arranged on said finger rail, co-acting contacts supported on said steering wheel, but insulated therefrom, and a spring member for each of the contact members on said finger rail for resiliently spacing the finger rail and the contacts thereon from the contacts connected with said steering wheel.

8. In a device of the character described, the combination of a steering wheel, of an electric signal having a circuit, said circuit including a plurality of spaced contacts arranged around said steering wheel, one of said contacts being supported by said steering wheel, a movable support connected with the other set of said contacts for movably supporting the same adjacent the first mentioned set of contacts and for moving the contacts for engagement whenever actuated, said movable support being arranged within reach of the hand at all times regardless of the point at which the hand engages the steering wheel whereby the circuit of said signal may be closed about shifting position of the handle.

9. In a device of the character described, the combination with the steering wheel of an automobile, or similar vehicle, and an electric horn, of a plurality of contacts interposed in the circuit of said horn, and a hand rail for operating some of said contacts for closing the circuit, said hand rail being formed of substantially the same contour as the outer part of said steering wheel and arranged adjacent said outer part in order to be readily operated by the hand of the operator without requiring any shifting thereof.

10. The combination with a steering-wheel and its shaft, of an electric signal having a circuit equipped with a movably supported substantially annular contact-member through which the circuit may be closed and of less diameter than the diameter of the steering-wheel and disposed in a plane close to the plane of the steering-wheel.

11. In means of the character set forth, an electric circuit comprising an annular contact-member adapted to be disposed near the steering-wheel of a motor-vehicle, and insulatingly mounted means for yieldingly supporting said annular contact-member adjacent to said steering-wheel.

12. A steering wheel, having a plurality of circuit closing switches, and a ring carried by the switches and concentric to the rim for actuating said switches.

13. A steering wheel having a plurality of spokes and a rim, a resiliently opened switch carried by each spoke, and a ring connected to all of the switches and in ready access to the hand of the operator without removal from the rim.

14. A steering wheel, including a plurality of spokes, a rim, a plurality of resiliently opened switches, one to each spoke, and a ring connected to all of the switches and disposed concentrically to the axis of and smaller than the steering rim.

In testimony whereof I have signed my name to this specification in the presence of two subscribing witnesses.

JAMES E. FOULKS, Jr.

Witnesses:
WILBUR N. SARVANT,
OLIVER N. SARVANT.